(12) United States Patent
Harima

(10) Patent No.: US 8,798,482 B2
(45) Date of Patent: Aug. 5, 2014

(54) INFRARED TRANSMITTER

(75) Inventor: Tatsuji Harima, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 652 days.

(21) Appl. No.: 12/739,733

(22) PCT Filed: Sep. 11, 2008

(86) PCT No.: PCT/JP2008/066894
§ 371 (c)(1),
(2), (4) Date: Apr. 23, 2010

(87) PCT Pub. No.: WO2009/054213
PCT Pub. Date: Apr. 30, 2009

(65) Prior Publication Data
US 2010/0226660 A1     Sep. 9, 2010

(30) Foreign Application Priority Data
Oct. 24, 2007 (JP) .................................. 2007-275989

(51) Int. Cl.
*H04B 10/00* (2013.01)
*H04B 10/04* (2006.01)
*H04B 10/12* (2006.01)

(52) U.S. Cl.
USPC ........... 398/197; 398/172; 398/182; 398/195; 398/198

(58) Field of Classification Search
None
See application file for complete search history.

(56) References Cited

U.S. PATENT DOCUMENTS

| | | | | |
|---|---|---|---|---|
| 4,903,273 A | * | 2/1990 | Bathe | 372/29.015 |
| 5,132,828 A | * | 7/1992 | Conner et al. | 398/158 |
| 2001/0027564 A1 | * | 10/2001 | Cowan et al. | 725/146 |
| 2008/0048795 A1 | * | 2/2008 | Hoshino et al. | 331/183 |
| 2008/0292323 A1 | * | 11/2008 | Zheng | 398/194 |

FOREIGN PATENT DOCUMENTS

| | | |
|---|---|---|
| JP | 62176225 | 8/1987 |
| JP | 03-026086 | 2/1991 |
| JP | 07-066780 A | 3/1995 |
| JP | 2007-053712 A | 3/2007 |

* cited by examiner

*Primary Examiner* — Darren E Wolf
(74) *Attorney, Agent, or Firm* — Whitham Curtis Christofferson & Cook, PC

(57) ABSTRACT

An infrared transmitter is obtained that transmits a signal by changing a luminance of an infrared emitting LED, the infrared transmitter including: a transmission signal generating unit; a biasing voltage generating unit that generates a biasing voltage according to a magnitude of a transmission signal; a signal/voltage mixing unit that mixes the transmission signal and the biasing voltage; and a voltage-current conversion unit that converts a voltage into a current, in which the LED is driven by the current obtained by the conversion in the voltage-current conversion unit, so that power consumption efficiency can be improved.

3 Claims, 7 Drawing Sheets

11: signal generating unit
12: signal/voltage mixing unit
13: bias voltage generating unit
14: voltage-current conversion unit
15: light signal transmitting unit 11: signal generating unit 11-a: signal generating unit
12-a: signal/voltage mixing unit
13-a: bias voltage generating unit
14: voltage-current conversion unit
15: light signal transmitting unit (b)

| | TRANSMISSION OFF | 1CH TRANSMISSION | 2CH TRANSMISSION |
|---|---|---|---|
| SW A | OFF | ON | ON |
| SW B | OFF | OFF | ON |
| | | | |
| Tr 131 | ON | OFF | OFF |
| Tr 132 | ON | ON | OFF |

INFRARED TRANSMITTER

TECHNICAL FIELD

The present invention relates to an infrared transmitter using an infrared-emitting diode and capable of improving power consumption efficiency.

BACKGROUND ART

Infrared transmitters include a light-emitting diode (hereinafter, referred to as an "LED") that emits an infrared ray, and uses a light modulation method in which a luminance of the LED is changed according to a signal to be transmitted.

Because a luminance of an LED changes according to a magnitude of a driving current flowing in the LED, the light modulation method is implemented by converting a transmission signal to an electrical current and using the electrical current as the driving current. Here, without a bias current equivalent to, or higher than 50% of the maximum amplitude level of the transmission signal, applied to the LED, a change in the electrical current into which the transmission signal is converted is saturated to hamper the appropriate modulation.

A relationship between a bias current for an LED and a maximum amplitude level of a transmitting signal is described with reference to drawings. In FIGS. 6 and 7, the longitudinal axis represents a driving current for an LED corresponding to an amplitude level of a transmitting signal, while the horizontal axis represents time.

FIG. 6 depicts a relationship between a driving current and a bias current value for an LED in an infrared transmitter that includes two channels (Ach and Bch) and transmits a signal of only a single channel at a time. As shown in FIG. 6, in the infrared transmitter that transmits a signal of only a single channel at a time, $I_1$ equivalent to, or higher than 50% of a driving current maximum value corresponding to a transmission signal of a single channel is set as the bias current value. Thus, even in an infrared transmitter including a plurality of channels, if a signal of a single channel is transmitted at a time, the driving current thereof is free of saturation by setting a value equivalent to or higher than 50% of the maximum amplitude of the signal of the single channel as the bias current value.

FIG. 7 depicts a relationship between a LED driving current and a bias current in an infrared transmitter capable of transmitting signals of the two channels (Ach and Bch) at a time.

As shown in FIG. 7, in transmitting signals of two channels at a time, the transmission signals are superimposed to make amplitude larger and, accordingly, the amplitude of the driving current becomes larger than that in the case of the single channel transmission. Therefore, a bias-current value $I_2$ equivalent to, or higher than 50% of the maximum value of the driving current becomes larger. The infrared transmitter capable of transmitting signals of two channels at a time has the bias current value $I_2$ set as described above even upon single channel transmission. Therefore, a larger current compared with that in the case with $I_1$ (FIG. 6) is consumed, which leads to an unnecessary use of a driving source of the transmitter.

A light modulation method that improves frequency characteristic by changing a driving current is proposed for the infrared transmitter having the problem as described above (see, for example, Patent Document 1).

An infrared transmitter disclosed in Patent Document 1 employs a light modulation method in which a driving current for an LED is changed to keep an output level of a transmitting signal constant and improve frequency characteristics. Still, the infrared transmitter cannot change a bias current according to an output level of a transmission signal.

[Patent Document 1] Japanese Patent Application Publication No. S62-176225

DISCLOSURE OF INVENTION

Problem to be Solved by the Invention

In the field of infrared transmitters, no infrared transmitter is known in which a bias current value for an LED is variable. The bias-current values have been set to a value equivalent to, or higher than 50% of the maximum value of a current required for driving an LED and the current is not reduced with a low signal level. Thus, power efficiency is low.

In view of the current situation as described above, an object of the present invention is to provide an infrared transmitter in which a bias current is changed based on a signal level of a transmission signal so that power is not consumed more than necessary to offer high power efficiency.

Means for Solving Problem

The present invention relates to an infrared transmitter that transmits a signal by changing a luminance of an infrared emitting LED. The infrared transmitter includes: a transmission signal generating unit; a biasing voltage generating unit that generates a biasing voltage according to a magnitude of a transmission signal; a signal/voltage mixing unit that mixes the transmission signal and the biasing voltage; and a voltage-current conversion unit that converts a voltage into a current. The LED is driven by the current obtained through the conversion in the voltage-current conversion unit.

Further the present invention relates to an infrared transmitter that transmits a signal by changing a luminance of an infrared emitting LED. The infrared transmitter includes: a transmission signal generating unit; a switching unit that switches number of channels of a transmission signal; a biasing voltage generating unit that generates a biasing voltage according to a magnitude of a transmission signal based on the number of channels of the transmission signal; a signal/voltage mixing unit that mixes the transmission signal and the biasing voltage; and a voltage-current conversion unit that converts a voltage into a current. The LED is driven by the current obtained by the conversion in the voltage-current conversion unit.

The biasing voltage generating unit may increase or reduce the biasing voltage in a nonstep manner according to the magnitude of the transmission signal.

Effects of the Invention

With the present invention, the bias current for driving the LED can be increased or reduced according to the number of signals transmitted at a time. Thus, the infrared transmitter with highly improved power efficiency can be obtained.

Figure 1:
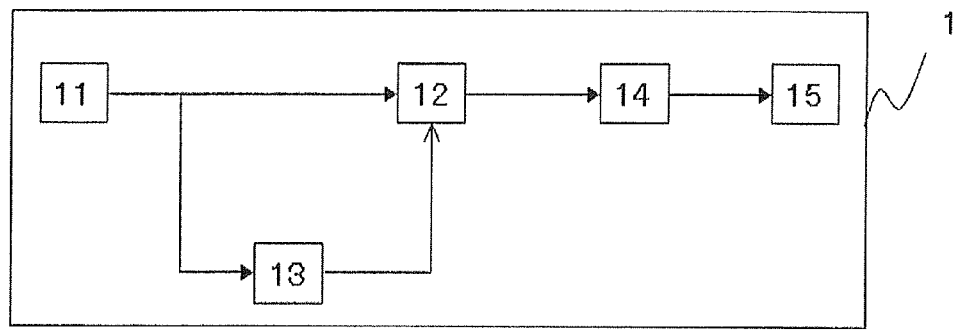
FIG. 1 is a functional block diagram of an embodiment of an infrared transmitter according to the present invention.

EXPLANATIONS OF LETTERS OR NUMERALS 1 transmitter
11 signal generating unit
12 signal/voltage mixing unit
13 biasing voltage generating unit
14 voltage-current conversion unit
15 light signal transmitting unit

BEST MODE(S) FOR CARRYING OUT THE INVENTION

An embodiment of an infrared transmitter according to the present invention is described below with reference to some drawings.

FIG. 1 is a block diagram of an exemplary structure of the infrared transmitter according to the present invention. In FIG. 1, this transmitter 1 includes: a signal generating unit 11; a signal/voltage mixing unit 12; a biasing voltage generating unit 13; a voltage-current conversion unit 14; and a light signal transmitting unit 15. The signal generation unit 11 generates a certain signal voltage upon an operation key not shown in the figure being pressed. For example, a certain sine signal for identifying the pressed operation key is generated. The signal/voltage mixing unit 12: superimposes a signal voltage output from the signal generating unit 11 on a voltage output from the bias voltage generating unit 13; and outputs the resultant voltage.

The biasing voltage generating unit 13 amplifies and rectifies the signal voltage output from the signal generating unit 11, amplifies the voltage to a certain level, and then outputs the voltage. With a higher input signal level, a larger voltage corresponding thereto is output to be fed to the signal/voltage mixing unit 12.

The voltage-current conversion unit 14 converts the voltage received from the signal/voltage mixing unit 12 into a current, and uses, for example, a MOS-FET as a main element thereof.

The light signal transmitting unit 15 drives the LED with the current obtained through the conversion in the voltage-current conversion unit 14 to output a light signal.

The current output from the voltage-current conversion unit 14 corresponds to the voltage obtained by superimposing the output voltage from the biasing voltage generating unit 13 on the signal voltage. Thus, the LED can be driven with the bias current corresponding to a magnitude of the input signal.

With the transmitter 1 configured as above, upon a plurality of operation keys being pressed, a larger signal voltage corresponding thereto is provided, compared with that in the case where the single operation key is pressed. The bias current can be increased or reduced in a nonstep manner according to the magnitude of the signal voltage. Therefore, a light signal can be efficiently output through preventing unnecessary power consumption.

Figure 2:
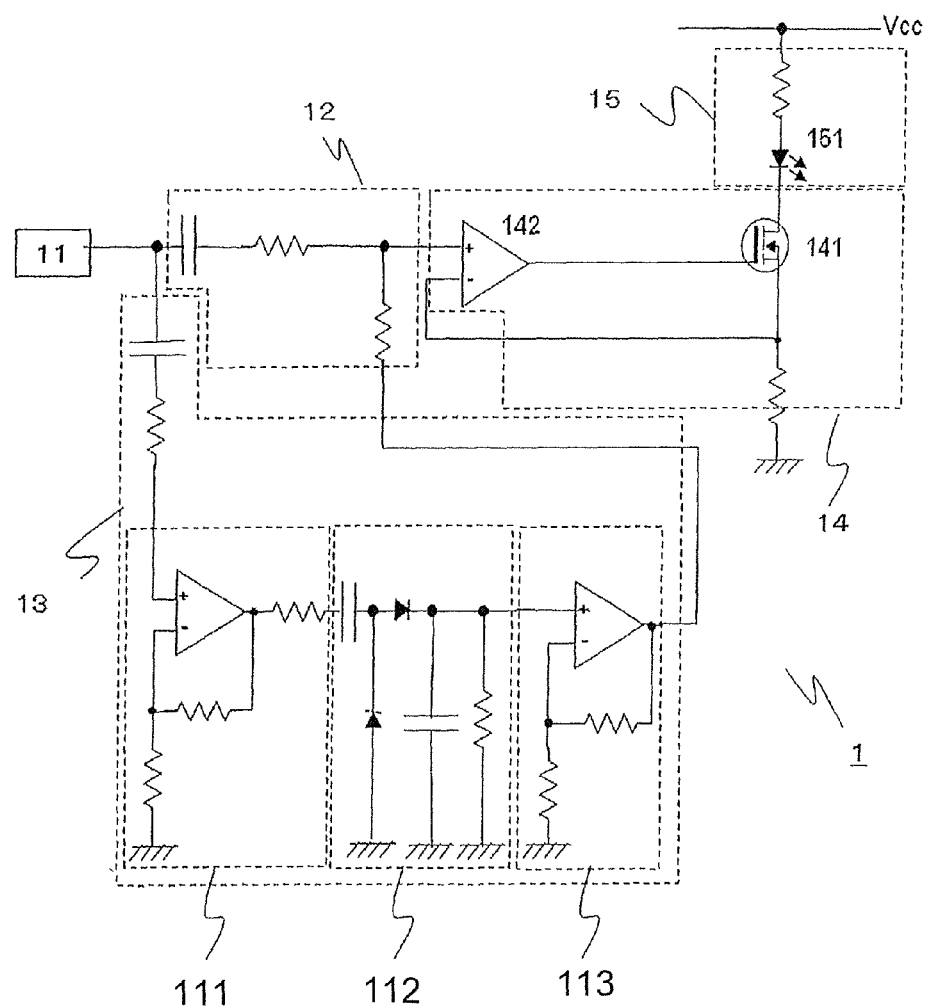
FIG. 2 is a circuit diagram of an exemplary circuit structure that the infrared transmitter includes.

A specific circuit configuration of the transmitter 1 is exemplary described with reference to FIG. 2. The signal generating unit 11 outputs the signal voltage corresponding to the operation key not shown in the figure. The signal voltage is: amplified to a certain level in an amplifier 111 in the biasing voltage generating unit 13; rectified and converted into a direct voltage in a rectifier 112 in the biasing voltage generating unit 13; adjusted to be at a certain level in a voltage amplifier 113 in the biasing voltage generating unit 13; and then is output. The direct voltage is superimposed on the voltage of the input signal in the signal/voltage mixing unit 12 and then fed to an OP amplifier 142, which is a component of the voltage-current conversion unit 14.

The OP amplifier 142 adjusts the received input voltage obtained by superimposing the biasing voltage on the input signal voltage to be at a certain level and then outputs the resultant voltage to be fed to a gate terminal of a FET 141. In the FET 141, a current corresponding to the voltage received through the gate terminal flows between the drain and the source.

Accordingly, an LED 151, which is a component of the light signal transmitting unit 15, connected to a drain terminal of the FET changes its luminance according to the driving current flowing in accordance with the received voltage.

Therefore, with a larger input signal, the LED is driven with a driving current in which a larger bias current is superimposed on a signal current. With a smaller input signal, the bias current to be superimposed is smaller. Thus, the bias current superimposed on the driving current is variable based on the number of signals to be transmitted. Accordingly, unnecessary power consumption can be reduced.

Figure 3:
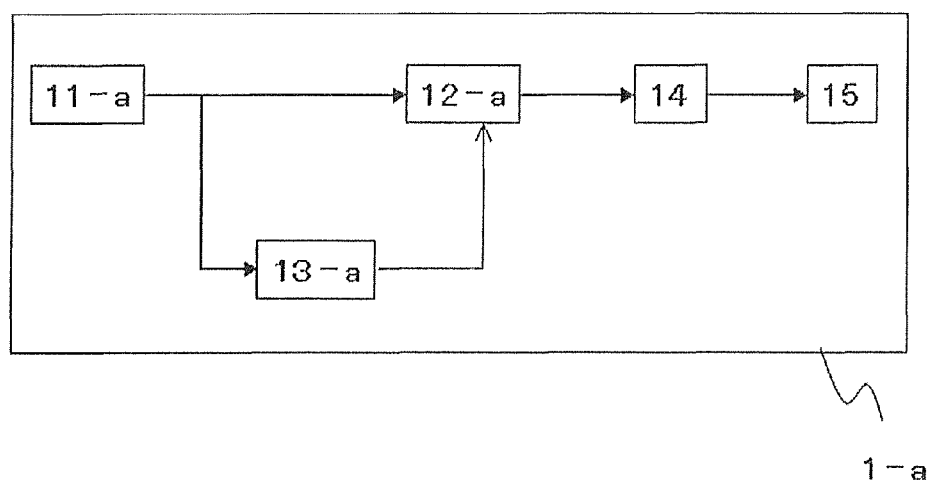
FIG. 3 is a functional block diagram of another embodiment of the infrared transmitter according to the present invention.

Next, another exemplary embodiment of an infrared transmitter according to the present invention is described below with reference to a block diagram of FIG. 3. In FIG. 3, this transmitter 1-a includes: a signal generating unit 11-a; a signal/voltage mixing unit 12-a; a biasing voltage generating unit 13-a; and the voltage-current conversion unit 14 and the light signal transmitting unit 15 having the same configurations as those in the above described transmitter 1. The signal generating unit 11-a includes: a unit that generates a certain signal upon for example, an operation key not shown being pressed; and a plurality of switching units with which the number of signals (the number of channels) transmitted at a time is selected.

The signal/voltage mixing unit 12-a superimposes a voltage output from the biasing voltage generating unit 13-a on a signal voltage output from the signal generating unit 11-a and outputs the resultant voltage.

The biasing voltage generating unit 13-a includes: a microcomputer that switches a bias voltage with the switching units included in the signal generating unit 11-a and; transistors.

The specific configuration of the transmitter 1-a is described below with reference to FIG. 4(a). The signal generating unit 11-a includes the signal generating unit and the switching units that are not shown in the figure. With the switching units, the number of signals transmitted at a time is switched. The switching unit is a switch and, as exemplary shown in FIG. 4(a), the signal generating unit 11-a includes two switches i.e., a switch A and a switch B.

The biasing voltage generating unit 13-a includes: a microcomputer 133 that outputs a control signal in a switching manner to a transistor Tr 131 and a transistor Tr 132 with the switching units included in the signal generating unit 11-a; and the transistors Tr 131 and Tr 132 in which operations thereof are turned on or off in accordance with the control signal output from the microcomputer 133. The transistors Tr 131 and Tr 132 each have: a base terminal into which the control signal from the microcomputer 133 is fed; a collector terminal to which a resistance element is connected; and an emitter terminal grounded.

Figure 4:
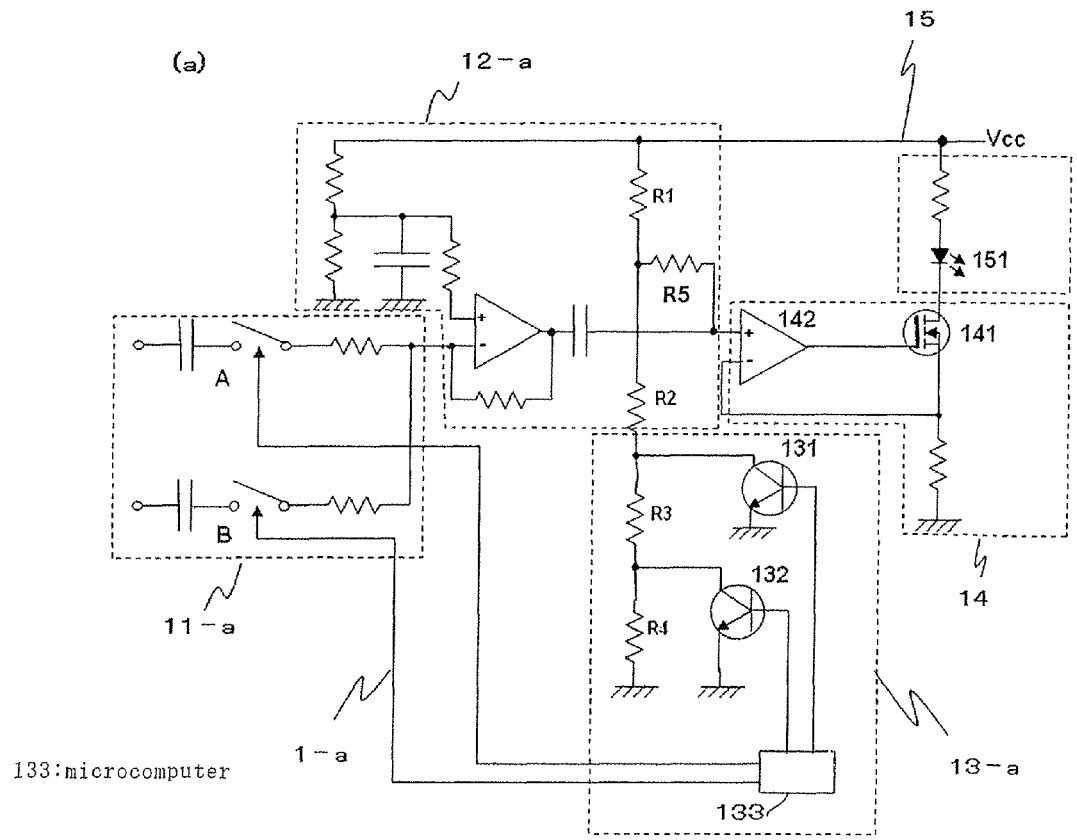
FIG. 4 is a circuit diagram of an exemplary circuit structure that the infrared transmitter includes.

FIG. 4 (b) is a chart depicting a relationship between operations of the switches A and B serving as the switching units, and operations of the Tr 131 and the Tr 132. As shown in FIG. 4 (b), the microcomputer 133 outputs the control signal so that the Tr 131 and the Tr 132 are turned on under a transmission OFF state, i.e., with both of the switches A and B turned off.

For example, for a single channel transmission, the switch A is on and the switch B is off. Here, the microcomputer 133 stops the transmission of the control signal to the Tr 131 so that the Tr 131 is off while the Tr 132 is on. For a two channel transmission (both switches A and B are on), the microcomputer 133 stops the transmission of the control signal to turn both Tr 131 and Tr 132 off.

Switching the Tr 131 and the Tr 132 on and off with the microcomputer 133 changes the voltage dividing ratio of a power voltage VCC. More specifically, through an operation of the switching units included in the signal generating unit 11-a, the number of resistances R1, R2, R3, and R4 dividing the power voltage VCC changes stepwise. Therefore, the biasing voltage, which is the divided voltage superimposed on a plus terminal of the OP amplifier 142 via a resistance R5 is switched in a stepwise manner.

Figure 5:
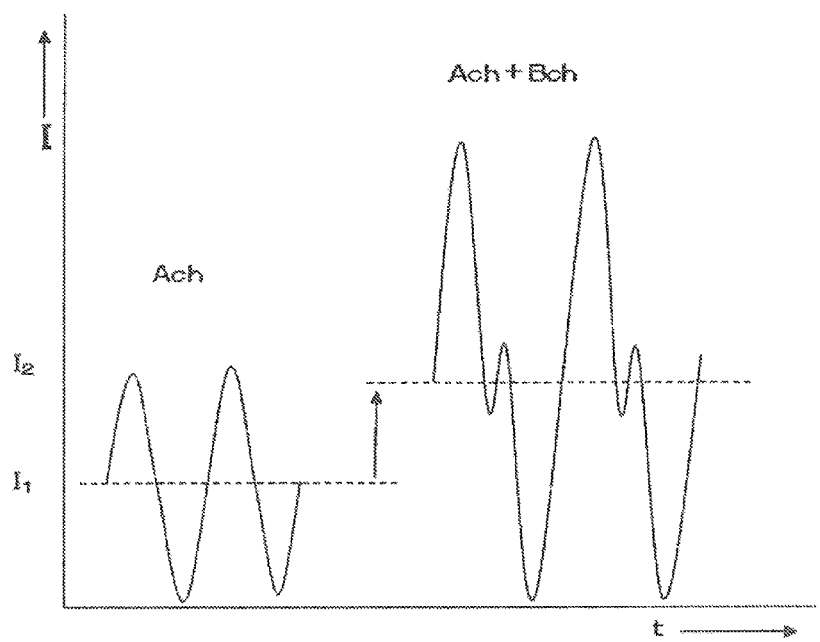
FIG. 5 is a waveform diagram depicting a relationship between a transmitting signal and a bias current in the infrared transmitter.
Figure 6:
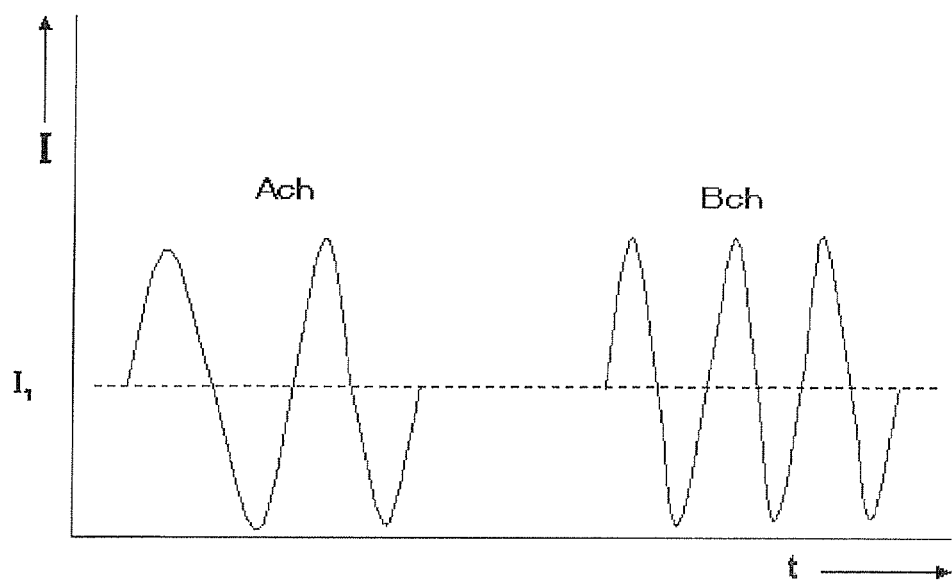
FIG. 6 is a waveform diagram depicting a relationship between a transmitting signal and a bias current in a conventional infrared transmitter.
Figure 7:
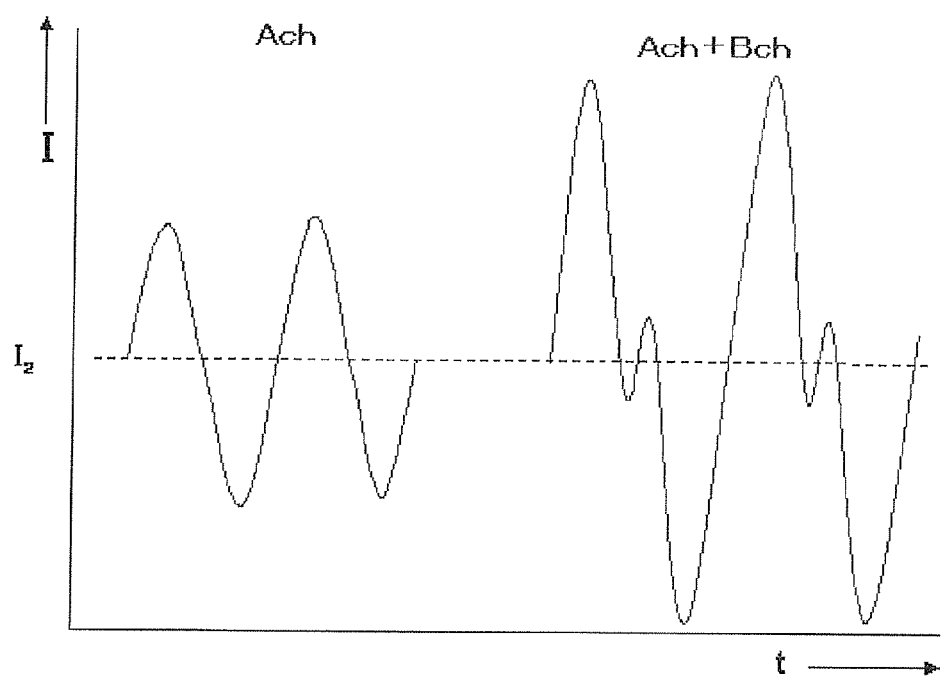
FIG. 7 is a waveform diagram depicting a relationship between a plurality of transmitting signals and a bias current in the infrared transmitter.

Next, a relationship between the number of transmission channels and the bias current in the infrared transmitter according to the present invention is described. FIG. 5 depicts a relationship between an LED driving current and a bias current in the infrared transmitter according to the present invention capable of transmitting signals of two channels (Ach and Bch) at a time.

As shown in FIG. 5, upon transmitting only a single channel (Ach), the biasing current value is $I_1$ equivalent to 50% of the maximum value of the driving current according to a signal from the single channel. Meanwhile, upon transmitting two channels (Ach and Bch) at a time, because the bias current is provided in the above described arrangement, a bias voltage $I_2$ is provided equivalent to 50% of the maximum value of the driving current for signals of the two channels. As described above, with the infrared transmitter according to the present invention, the LED 151 can be controlled with: a small bias current when the number of transmitting channels is small; and a large biasing current when the number of transmitting channels is large. Thus, an unnecessary consumption of power can be prevented.

INDUSTRIAL APPLICABILITY

The present invention can be applied in a simultaneous interpretation system in which a single infrared transmitter transmits voices as a result of translating a voice into a plurality of languages.

The invention claimed is:

1. An infrared transmitter that transmits an optical transmission signal through changing a luminance of an infrared emitting LED, the infrared transmitter comprising:
    a transmission signal generating unit that generates an electrical transmission signal;
    a switching unit that changes a number of channels in the electrical transmission signal, wherein the number of channels is greater than or equal to two;
    a biasing voltage generating unit that generates a stepwise biasing voltage according to the number of channels of the electrical transmission signal that are changed by the switching unit;
    a signal/voltage mixing unit that mixes the electrical transmission signal and the stepwise biasing voltage; and
    a voltage-current conversion unit that converts the mixed electrical transmission signal and the stepwise biasing voltage into a current,
    wherein the infrared emitting LED is driven with the current obtained by conversion in the voltage-current conversion unit, and
    wherein the infrared emitting LED is a single infrared emitting LED.

2. The infrared transmitter according to claim 1, wherein the biasing voltage generating unit includes:
    a detecting unit that detects a magnitude of the electrical transmission signal; and
    a voltage generating unit that generates the stepwise biasing voltage based on the magnitude of the electrical transmission signal,
    wherein the biasing voltage generating unit automatically increases or reduces the stepwise biasing voltage according to the magnitude of the electrical transmission signal.

3. The infrared transmitter according to claim 1, wherein the biasing voltage generating unit includes:
    a microcomputer;
    a first transistor; and
    a second transistor;
    wherein the microcomputer outputs a control signal to the first transistor and the second transistor based on the number of channels of the electrical transmission signal, and
    wherein operations of the first and second transistors are turned on and off in accordance with the control signal outputted from the microcomputer.

* * * * *